US007099026B1

(12) United States Patent
Hren

(10) Patent No.: US 7,099,026 B1
(45) Date of Patent: Aug. 29, 2006

(54) UNIQUE PRINTER PASS CODE SYSTEM AND METHOD

(75) Inventor: Allan Anthony Hren, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 1040 days.

(21) Appl. No.: 09/690,350

(22) Filed: Oct. 17, 2000

(51) Int. Cl.
G06K 15/00 (2006.01)

(52) U.S. Cl. ..................................... 358/1.15; 358/1.6
(58) Field of Classification Search ................ 358/1.9, 358/1.15, 1.1, 1.13, 1.14, 1.16, 1.17, 1.18, 358/407, 1.5, 296, 1.6
See application file for complete search history.

(56) References Cited

U.S. PATENT DOCUMENTS

| | | | | |
|---|---|---|---|---|
| 5,384,449 | A * | 1/1995 | Peirce | 235/380 |
| 5,398,285 | A * | 3/1995 | Borgelt et al. | 380/30 |
| 5,557,346 | A * | 9/1996 | Lipner et al. | 380/286 |
| 5,594,838 | A * | 1/1997 | Christopher et al. | 358/1.18 |
| 5,630,062 | A * | 5/1997 | Okutsu | 718/100 |
| 5,652,626 | A * | 7/1997 | Kawakami et al. | 348/463 |
| 5,838,256 | A | 11/1998 | Pearson et al. | 340/825.31 |
| 5,848,231 | A | 12/1998 | Teitelbaum et al. | 395/186 |
| 5,923,841 | A | 7/1999 | Lee | 395/188.01 |
| 5,968,175 | A | 10/1999 | Morishita et al. | 713/200 |
| 6,005,476 | A | 12/1999 | Valiulis | 340/310.01 |
| 6,076,076 | A * | 6/2000 | Gottfreid | 705/45 |
| 6,088,684 | A | 7/2000 | Custy et al. | 705/35 |
| 6,137,590 | A * | 10/2000 | Mori | 358/1.17 |
| 6,415,341 | B1 * | 7/2002 | Fry et al. | 710/62 |
| 6,567,793 | B1 * | 5/2003 | Hicks et al. | 705/51 |
| 6,671,749 | B1 * | 12/2003 | Williams et al. | 710/10 |
| 6,707,566 | B1 * | 3/2004 | Endoh | 358/1.15 |

(Continued)

FOREIGN PATENT DOCUMENTS

JP 03030253 11/1992

(Continued)

OTHER PUBLICATIONS

Remote Terminal-Computer Communication Security System, IBM Technical Disclosure Bulletin, vol. 16 No. 7, Dec. 1973, pp. 2312-2314.

(Continued)

Primary Examiner—Jerome Grant
(74) Attorney, Agent, or Firm—Kunzler & Associates

(57) ABSTRACT

A unique printer pass code system and method provide the ability to remotely generate a unique pass code for printers operating under the system and method. A printer is configured to independently verify that a submitted pass code is the correct pass code for that printer. The pass code may be generated based upon a unique character string or other characteristic resident within the printer. The unique character string may comprise a serial number programmed into a printer controller during manufacturing of the printer. The unique character string is accessed and passed through a mathematical manipulation algorithm which transforms the character string into a pass code. The pass code may be a truncated result of the mathematical manipulations. One version of the algorithm may be remote to the printer for generating the pass code and a second version may be resident within the printer for validating submitted pass codes. In one application, customer service representatives receive the serial number from customers desiring to enable a dormant feature of the printer and enter the serial number into a computer program. The program mathematically manipulates and truncates the serial number and outputs the resultant pass code. The customer enters the pass code into the printer, which independently verifies the pass code and if the pass code is correct, enables the printer function.

19 Claims, 2 Drawing Sheets

U.S. PATENT DOCUMENTS

2002/0012445 A1* 1/2002 Perry .................... 382/100
2003/0009672 A1* 1/2003 Goodman .................. 713/176
2004/0046995 A1* 3/2004 Silverbrook et al. ....... 358/1.15

FOREIGN PATENT DOCUMENTS

| JP | 07013787 | 9/1996 |
| JP | 8234934 | 9/1996 |
| JP | 8314659 | 11/1996 |
| JP | 10242765 | 3/2000 |

OTHER PUBLICATIONS

Object execution locking using password-provides single workstation available for several people to use and restricts execution of certain objects to specific users, RD-349079 Research Disclosure, May 1993, No. 5, Kenneth Mason Publication Ltd, England.

* cited by examiner

UNIQUE PRINTER PASS CODE SYSTEM AND METHOD

BACKGROUND OF THE INVENTION

1. The Field of the Invention

The present invention relates to systems and methods for remotely providing a unique pass code that is recognizable by a printer. More specifically, the present invention relates to systems and methods that automatically generate a pass code based upon a unique characteristic of the printer and recognizing the pass code by the printer.

2. The Relevant Art

As printer systems increase in complexity and functionality, increased demands are being placed on the printers. For instance, in certain cases, it is desirable to generate a line of printers with varying capabilities. One way to decrease the cost of manufacturing the printers is to make certain features dormant until initialized.

Additionally, printer manufacturers may want to control the enablement of these features. For instance, certain features may require added attention for safety, longevity, or effectiveness purposes. It may be desirable to ensure that operators of these printers have been given proper instruction and training for use of the feature. Additionally, different price points can be achieved for the same printer by enabling only features that are paid for by the customer.

Being able to enable features of a printer after sale of the printer provides the added benefit of allowing customers the luxury of electing to purchase the features after purchasing the printer. Under such a scheme, a customer is allowed to buy the printer without paying for a feature, and to decide later that the feature is desirable. The customer can then contact the printer manufacturer's customer service department and request the feature. After paying the requisite price, and/or undertaking certain training or receiving precautions, the feature is then enabled for the customer.

In order to make the process of enabling inherent but dormant features of printers more convenient and effective, it would be beneficial to be able to remotely enable the features. In so doing, it would be particularly beneficial to be able to do so in a manner which is unique to each printer and which is not readily apparent to a customer.

Pass codes have been used in the prior art to enable dormant features of products. Nevertheless, the use of pass codes as conducted by the prior art does not meet the particular requirements discussed above as being beneficial for printers. For instance, prior art pass codes are typically standard for a whole line of printers. When a customer has more than one printer, the customer only needs the one pass code and can enable the feature for each of the printers. Additionally, these pass codes run the danger of becoming publically and universally known.

Accordingly, it would be beneficial to provide a system and method of uniquely and remotely generating a pass code that is unique to a printer and for independently validating the pass code by the printer. Such a system and method are disclosed herein. Furthermore, many printers are not configured to allow users to conveniently allow a user to add large numbers, so it would be even more beneficial to provide a pass code that is easily entered by a user.

OBJECT AND BRIEF SUMMARY OF THE INVENTION

The printer configuration system and method of the present invention have been developed in response to the present state of the art, and in particular, in response to the problems and needs in the art that have not yet been fully solved by currently available printer systems and methods. Accordingly, it is an overall object of the present invention to provide a printer pass code system and method that overcome many or all of the above-discussed shortcomings in the art.

To achieve the foregoing object, and in accordance with the invention as embodied and broadly described herein in the preferred embodiment, a printer pass code system and method for remotely generating a unique passcode recognizable by a printer are provided:

The printer pass code system in one embodiment comprises a unique character string assigned to a printer, a manipulation algorithm for mathematically manipulating the unique string, and a verification module within the printer for recognizing the mathematically manipulated character string as a pass code. The unique character string may comprise a printer serial number resident within the printer and may be programmed into a digital controller of the printer during manufacturing of the printer.

In one embodiment, the manipulation algorithm is embodied within a computer program that is configured to receive the character string as input, conduct mathematical manipulations on the character string, and output the result as the pass code. Preferably, one of the mathematical manipulations is a truncation operation whereby the mathematically manipulated serial number is truncated into a shorter string of characters.

The printer is preferably configured to receive entry of the pass code by a user and pass the pass code to the verification module. The verification module is preferably located within the printer and is configured to receive the pass code and to conduct a mathematical manipulation similar to the one used to generate the pass code and to compare the result to the pass code entered into the printer to see if the two codes correspond.

A feature enablement module may be provided and is preferably configured to enable a previously disabled feature of the printer in response to the validation module validating the mathematically manipulated character string as a correct pass code for the printer.

A method of remotely generating a unique printer pass code recognizable by a printer is also provided under the present invention. In embodiments disclosed herein, the method comprises providing a unique character string for a printer, mathematically manipulating the unique character string, and recognizing the mathematically manipulated character string as a pass code.

The unique character string for a printer may comprise a printer serial number resident within the printer, and locating a printer serial number resident with in the printer may comprise locating a printer serial number programmed into a digital controller during manufacturing of the printer.

Additionally, mathematically manipulating the unique character string may comprise entering the character string into a computer program which receives the character string as input, conducting mathematical manipulations on the character string, and outputting the result as the pass code. In one embodiment, mathematically manipulating the unique character string comprises truncating the result of a series of mathematical operations on the character string.

The pass code is preferably provided to a customer in return for the customer performing a desired action. The pass code is then entered into the printer by the customer, and the printer then conducts a mathematical manipulation similar to the one used to generate the pass code and compares the result to the pass code entered into the printer to see if the two codes correspond.

A previously dormant feature of the printer is then preferably enabled in response to a favorable result of recognizing the mathematically manipulated character string as a correct pass code for the printer.

BRIEF DESCRIPTION OF THE DRAWINGS

In order that the manner in which the advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
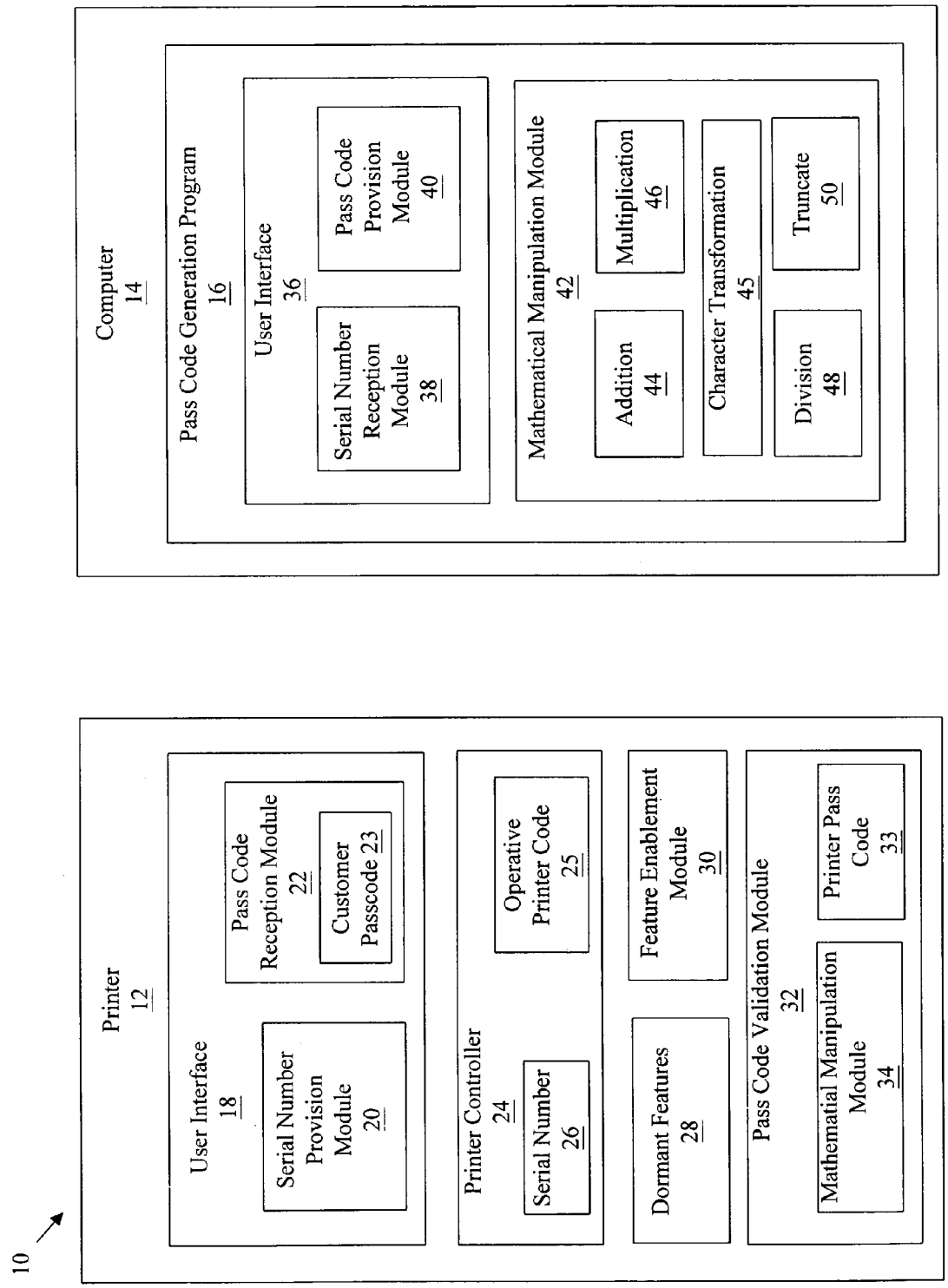
FIG. 1 is a schematic block diagram illustrating one embodiment of a printer pass code system of the present invention.

Referring initially to FIG. 1, shown therein is schematic block diagram of one embodiment of a printer pass code system of the present invention. As depicted in FIG. 1, the system 10 comprises a printer 12 and a pass code generation program 16 resident on a computer 14 that is remote to the printer 12. Shown within the printer 12 is a user interface 18 comprised of a serial number provision module 20 and a pass code reception module 22. In embodiments to be discussed herein, the serial number provision module 20 is configured to locate a serial number 26 and to provide that serial number to a user. The pass code reception module 22 is configured to receive a customer pass code 23 from a user.

Also present within the printer 12 in the depicted embodiment is a controller 24 having resident therein an operative computer software program or code 25 and a serial number 26. The operative computer code 25 is preferably the computer code with which the computer operates. The serial number 26 is preferably a unique number programmed into the controller 24 or other component of the printer 12 during manufacturing of the printer 12.

Other unique characteristics of the printer may be used in lieu of a programmed serial number. These include unique character strings such as product registraction numbers or service contract numbers. These character strings may be input into the printer by the customer at some point in the printer life, including at the request of a customer service representative, as will be discussed.

One or more dormant features 28 are also preferably resident within the printer 12 and may be programmed into or controlled by the operative printer code 25. The dormant features 28 are preferably features of the printer such as extra fonts, additional capabilities, automatic drum rotation, and the like for which it is desired that not all customers of the printer initially receive. As discussed above, this may be because not all customers want the feature and are willing to pay for the feature, because the manufacturer wishes to charge more for the feature, or because it is desirable to ensure that the customer performs a requisite act before accessing the feature.

The requisite acts may include the customer passing through a special training program, receiving special operating instructions, or merely paying a fee for the use of the dormant feature(s) 28.

A feature enablement module 30 of the printer 12 is preferably configured to enable selected dormant features upon receipt and validation of the customer pass code 23. The feature enablement module 30 may likewise be contained within the operative printer code 25 or may be independent thereof.

The printer 12 is also shown provided with a validation module 32. The validation module 32 is preferably configured to receive and validate the customer pass code 23. In one preferred embodiment, this is accomplished by comparing the customer pass code 23 to a printer version of the pass code 33, and validating the customer pass code 23 if it matches the printer version of the pass code 33. The printer version of the pass code is preferably generated by passing it through a mathematical manipulation module 34 similar to a mathematical manipulation module 42 which is used to generate the customer pass code 23. The validation module 32 may be incorporated within the operative printer code 25 or may be independent thereof.

The pass code generation program 16 is preferably retained within the manufacturer's control. In one embodiment, the computer 14 is a customer service computer, and the pass code generation program 16 is accessible to customer service personnel or the like from the computer 14. Within the pass code generation program 16 is a user interface 36 comprised of a serial number reception module 38 and a pass code provision module 40. The user interface 36 is preferably a graphical user interface program such as a standard windows program, from which the customer service representative can access the serial number reception module 38 to enter the serial number provided by the customer and from which the customer may access the pass code provision module 40 to receive the pass code generated by the program 16.

The pass code generation program 16 also preferably comprises a mathematical manipulation module 42, which in one embodiment is configured to receive the serial number 26 through the user interface 36 and to conduct a series of mathematical manipulations on the serial number and to output the result as the customer pass code 23. The mathematical manipulations may include addition/subtraction 44, multiplication 46, division 48, truncation 50, and the like. In one embodiment, the mathematical manipulation also comprises a module 45 for transforming alphabetic letters to numbers. The truncation operation 45 is, in one embodiment, used to reduce the pass code to a size that is easily entered into the printer by a user. In one embodiment, the serial number contains seven or more characters, and the truncation module truncates the mathematically manipulated result into a shorter pass code, such as a three digit pass code.

Figure 2:
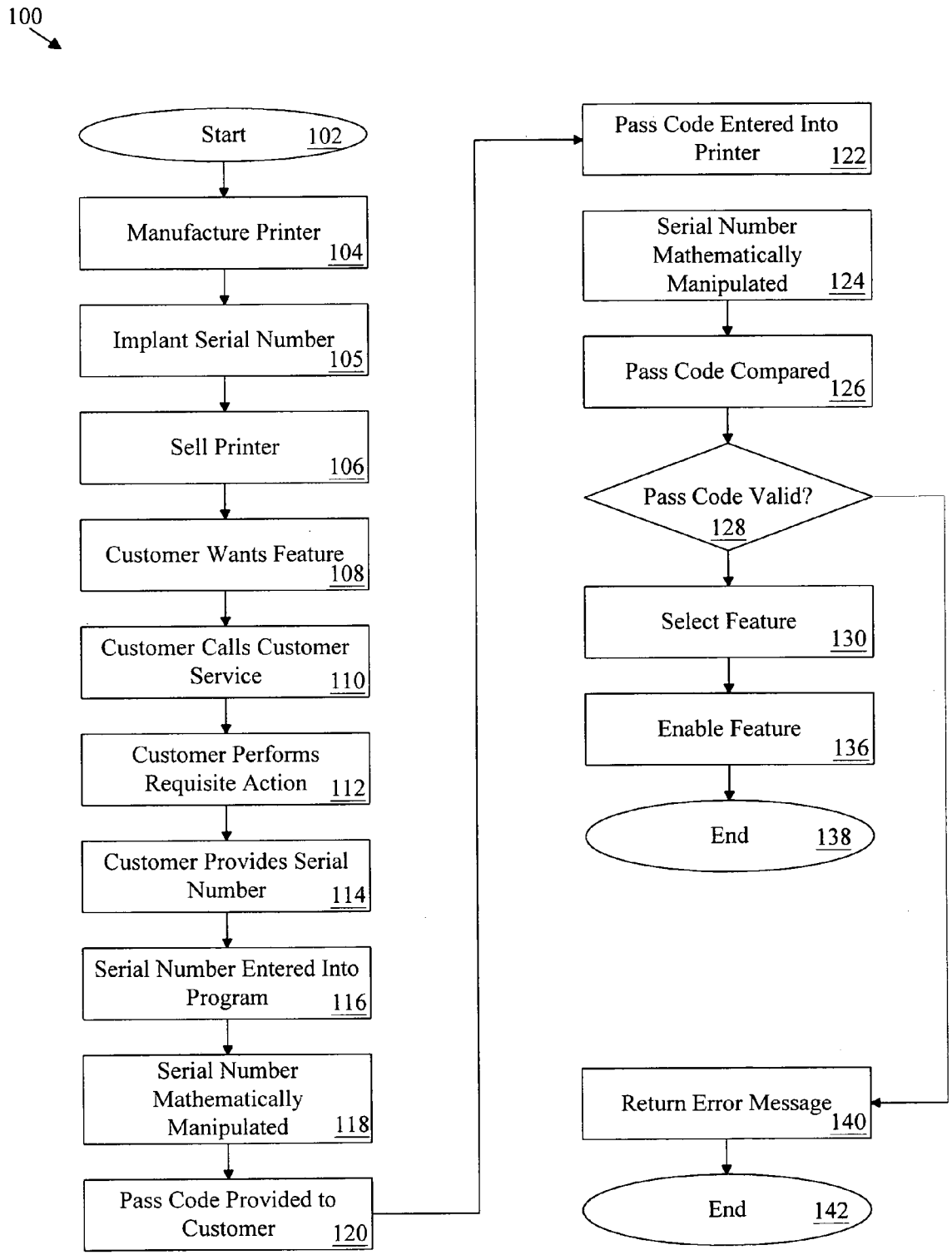
FIG. 2 is a schematic flow chart diagram illustrating one embodiment of a method of the present invention for remotely generating and using a printer pass code.

Referring now to FIG. 2, shown therein is a schematic flow chart diagram illustrating one embodiment of a method 100 for remotely generating and using a pass code. The method 100 begins at a step 102 and proceeds to a step 104, where the printer is manufactured. In one embodiment, the printer comprises the printer 12 of FIG. 1 and is configured in the manner discussed above. Coincident with the manufacturing of the printer, a serial number 26 (of FIG. 1) is in one embodiment implanted into the printer 12 as indicated at a step 105. The serial number 26 is preferably unique to the printer, as discussed above. Of course, the serial number may be merely stamped or printed on the surface of the printer, in which case, the serial number will have to be manually entered into the printer prior to the step 124.

Additionally, as indicated previously, the serial number is but one example of a unique characteristic that may be the basis upon which the customer pass code is generated. Other unique characteristics that may be used, including product registration numbers or service contract numbers are used in a similar manner to the serial number, and consequently, only the use of the serial number will be discussed herein. Nevertheless, this discussion of the use of a serial number should be considered as representative of the use of other types of unique characteristics or unique strings that may be used.

As indicated at a step 106, the printer is then sold to a customer. In one embodiment, the printer contains one or more dormant features 28 (of FIG. 1) that are not enabled and which remain dormant after the sale of the printer 12. Thus, at a step 108, the customer decides that he/she desires to use one or more of the dormant features. The customer then contacts the manufacturer, for instance, by calling customer service, as indicated at a step 110.

As indicated at a step 112, the customer is requested to perform certain requisite actions, and the customer performs these actions. As discussed above, these actions may comprise, for example, special training, receiving certain instructions, or paying a fee. Once the requisite actions are performed, the customer is requested to ascertain the serial number 26 of the printer 12. The serial number 26 may be printed on the printer, and be readable by the customer, or the customer may be instructed to access the serial number 26 using the user interface 18. The user interface, through the serial number provision module 20 then communicates with the controller 24 and provides the serial number 26 to the customer. The customer then provides the serial number to the customer service representative, as indicated at the step 114. Of course, if the serial number or other unique characteristic that is to be used as the seed for generation of the customer pass code is already known to the customer representative, step 114 may be omitted.

The customer service representative at a step 116 then enters the serial number 26 (or other unique characteristic) into the pass code generation program 16 that is preferably resident or accessible through a computer 14 to which the customer service representative has access. The customer service representative preferably uses the serial number reception module 38 through the user interface 36, as discussed above.

The serial number 26 or other string is then passed to the mathematical manipulation module, and at a step 118, the serial number is mathematically manipulated in a selected manner. In one embodiment, the mathematical manipulation comprises adding selected digits of the serial number together, multiplying the sum by a selected integer, then adding the sum to that product. The result is then truncated into a three digit customer pass code 23. Of course, any suitable manipulation may be conducted, whether mathematical or not. In addition, the mathematical manipulations may include any combination of addition/subtraction 44, transformation of letters 45, multiplication 46, division 48, truncation 50, and any other selected operations.

The resultant customer pass code 23 is then provided to the customer at a step 120. The customer then enters the customer pass code 23 into the printer 12 at a step 122. The pass code 23 is preferably received by the pass code reception module 22 through the user interface 18. The customer pass code 23 is then provided to the pass code validation module 32, where it is validated. A version of the pass code 23 may be programmed into the printer 12 during manufacturing of the printer in one embodiment and may be compared to the customer pass code. In a further embodiment, to be described herein, the customer pass code 23 is compared to a version of the pass code generated by the printer 12.

Under this embodiment, the serial number 26 is accessed by the validation module 32. The serial number is preferably accessed from the printer controller 24, but could be manually inputted into the printer 12 by the customer or another person such as maintenance personnel or the customer service representative, as discussed above.

The serial number 26 is then mathematically manipulated, preferably in the same manner as the mathematical manipulation conducted by the mathematical manipulation module 42 of the Program 16. The resultant character string is a printer version 33 of the pass code which, as indicated by a step 126, is compared to the entered customer pass code 23. As shown at the decision step 128, if the printer generated pass code 33 matches the customer pass code 23, the customer pass code 23 is considered valid.

When the customer pass code 23 is deemed to be valid, the dormant feature 28 to be enabled is selected through the user interface 18 at a step 130. Of course, if only one feature is dormant in the printer, this step may be omitted. Selection of the feature may be conducted automatically by the mathematical manipulations, wherein the feature is assigned a code that is embedded into the mathematical manipulations. Alternately, a separate code for the particular feature may be provided to the customer and the customer then enters the separate code.

Once the feature or features 28 are selected, the features are enabled by the feature enablement module 30, as indicated at step 136. The method 100 then terminates at a step 138.

If the result of the validation step 128 is a negative, that is, the pass code is deemed to be invalid, the method 100 proceeds to a step 140, where an error message is returned to the customer. The dormant features 28 are not enabled, and the method 100 ends.

As can be seen from the above discussion, several problems existing in the art have been overcome by the system and method of the present invention. A printer manufacturer is now provided with the ability to manufacture and sell printers with dormant features that can be enabled remotely in a controlled manner. Customers may determine a need for a dormant feature after the time of sale of the printer and may enable the feature under supervision of the printer manufacturer. A pass code can be generated based upon a unique characteristic of the printer, such as an internal serial number, and the pass code can be independently verified by the printer prior to enabling the dormant feature.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of remotely generating a unique printer pass code recognizable by a printer and enabling a printer feature, the method comprising:

providing a unique character string for a printer;
mathematically manipulating the unique character string to generate a printer specific pass code, wherein the printer specific pass code is differentiated from the unique character string;
communicating the pass code to the printer; and
enabling a previously disabled printer feature following the successful validation of the pass code by the printer.

2. The method of claim 1, wherein providing a unique character string for a printer comprises locating a printer serial number resident within the printer.

3. The method of claim 2, wherein locating a printer serial number resident within the printer comprises locating a printer serial number programmed into a digital controller during manufacturing of the printer.

4. The method of claim 1, wherein providing a unique character string for a printer is conducted by a user of the printer and wherein mathematically manipulating the unique character string comprises entering the character string into a computer program which receives the character string as input, conducting mathematical manipulations on the character string, and outputting the result as the pass code.

5. The method of claim 1, further comprising entering the pass code into the printer.

6. The method of claim 5, wherein the successful validation of the pass code is conducted subsequent to entering the pass code into the printer and further comprises the printer conducting a mathematical manipulation similar to the one used to generate the pass code and comparing the result to the pass code entered into the printer to see if the two codes correspond.

7. The method of claim 1, wherein mathematically manipulating the unique character string comprises conducting a series of mathematical operations on the character string.

8. The method of claim 7, wherein mathematically manipulating the unique character string further comprises truncating the result of the series of mathematical operations on the character string.

9. The method of claim 1, further comprising providing the pass code to a customer in return for the customer performing a desired action.

10. A printer pass code system, for remotely generating a unique printer pass code recognizable by a printer and enabling a printer feature, the system comprising:
a unique character string assigned to a printer;
a manipulation algorithm for mathematically manipulating the unique character string to generate a printer specific pass code, wherein the printer specific pass code is differentiated from the unique character string;
a verification module configured to validate the mathematically manipulated character string as a pass code;
a feature enablement module configured to enable a previously disabled printer feature following the validation of the pass code by the verification module, wherein the printer feature remains enabled.

11. The system of claim 10, wherein the unique character string comprises a printer serial number resident within the printer.

12. The system of claim 11, wherein the printer serial number resident within the printer comprises a printer serial number programmed into a digital controller of the printer during manufacturing of the printer.

13. The system of claim 10, wherein the manipulation algorithm is embodied in a computer program which is configured to receive the unique character string as input, conduct mathematical manipulations on the character string, and output the result as the pass code.

14. The system of claim 10, wherein the printer is configured to receive entry of the pass code by a user.

15. The system of claim 14, wherein the verification module is located within the printer and is configured to receive the pass code and to conduct a mathematical manipulation similar to the one used to generate the pass code and to compare the result to the pass code entered into the printer to see if the two codes correspond.

16. The system of claim 10, wherein the manipulation module is configured to encode a selected printer feature into the pass code and wherein the feature enablement module is configured to enable a previously disabled feature of the printer encoded in the pass code by the manipulation module.

17. The system of claim 10, wherein the mathematical manipulation module is configured to conduct a series of mathematical operations on the unique character string.

18. The system of claim 17, wherein the mathematical manipulation module is configured to truncate the result of the series of mathematical operations on the unique character string.

19. The method of claim 10, further comprising a feature of the printer that is accessible to a customer only with the use of the pass code.

* * * * *